No. 697,158. Patented Apr. 8, 1902.
G. P. McDONNELL.
ELECTRIC CIRCUIT REGULATING DEVICE.
(Application filed Oct. 28, 1901.)

(No Model.) 2 Sheets—Sheet 1.

Witnesses:
C. A. Trelin
George Bakewell

Inventor:
George P. McDonnell.
by Bakewell & Cornwell
Attys.

No. 697,158. Patented Apr. 8, 1902.
G. P. McDONNELL.
ELECTRIC CIRCUIT REGULATING DEVICE.
(Application filed Oct. 28, 1901.)
(No Model.) 2 Sheets—Sheet 2.
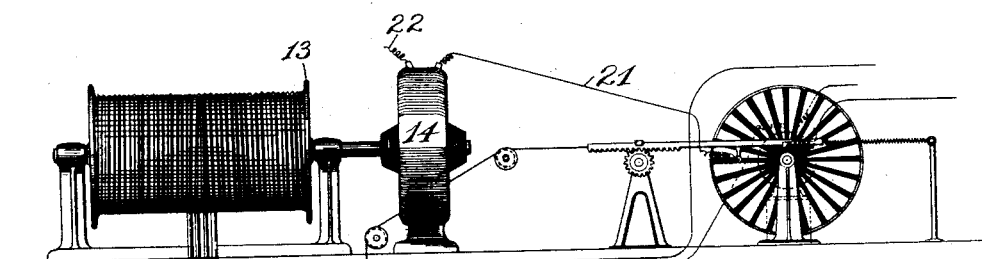
Fig. 4.
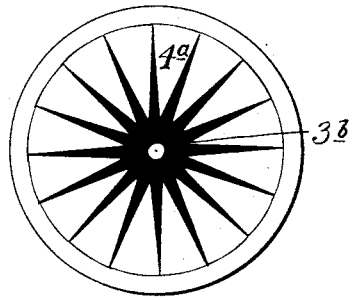
Fig. 5.
Fig. 6.
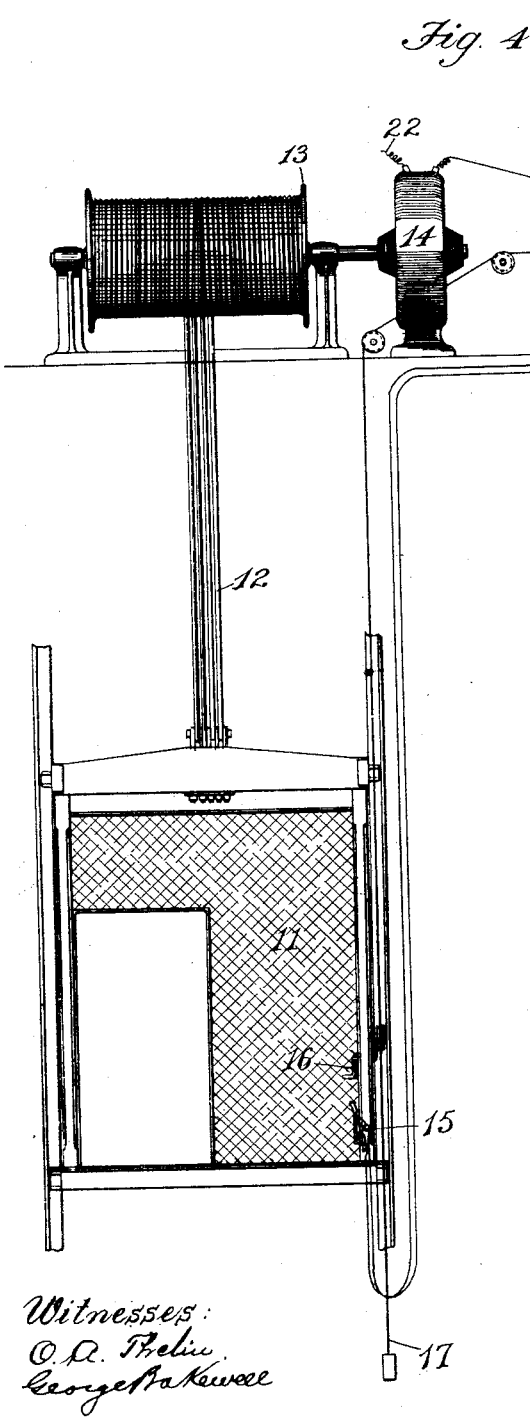
Witnesses:
O. R. Thelin
George Bakewell
Inventor:
George P. McDonnell.
by Bakewell Cornwall
Attys.

UNITED STATES PATENT OFFICE.

GEORGE P. McDONNELL, OF ST. LOUIS, MISSOURI, ASSIGNOR OF FORTY-NINE ONE-HUNDREDTHS TO OSCAR E. PLOCHMAN AND RICHARD F. SPENCER, OF ST. LOUIS, MISSOURI.

ELECTRIC-CIRCUIT-REGULATING DEVICE.

SPECIFICATION forming part of Letters Patent No. 697,158, dated April 8, 1902.

Application filed October 28, 1901. Serial No. 80,270. (No model.)

*To all whom it may concern:*

Be it known that I, GEORGE P. MCDONNELL, a citizen of the United States, residing at the city of St. Louis, State of Missouri, have invented a certain new and useful Improvement in Electric-Circuit-Regulating Devices, of which the following is a full, clear, and exact description, such as will enable others skilled in the art to which it appertains to make and use the same, reference being had to the accompanying drawings, forming a part of this specification, in which—

Figure 1:
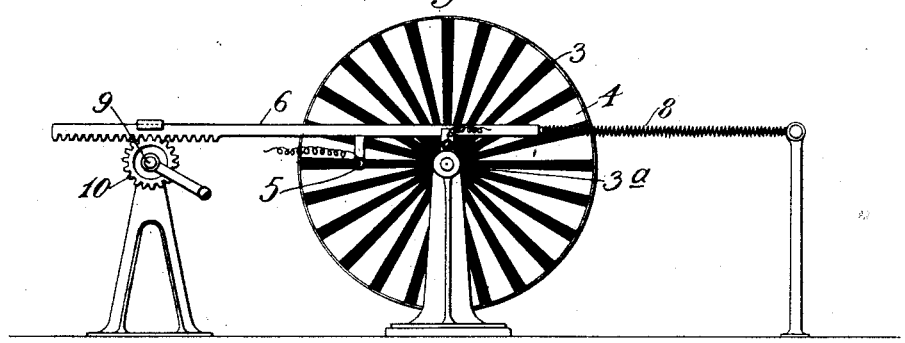
Figure 2:
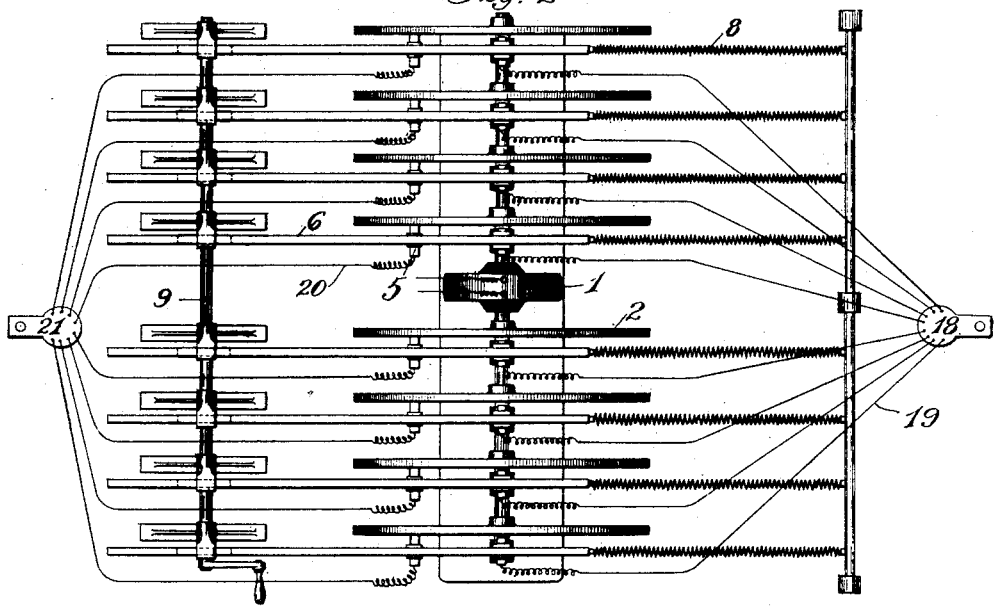
Figure 3:
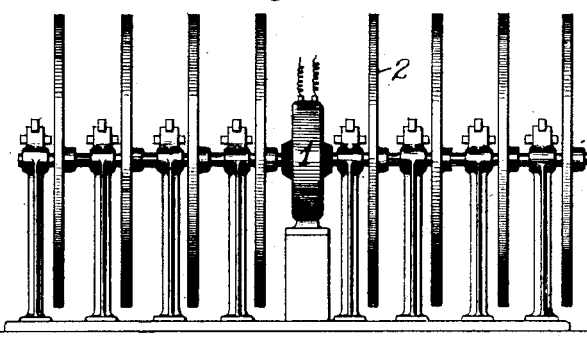

Figure 1 is a side elevational view of my improved regulating device for electric circuits. Fig. 2 is a top plan view of the same. Fig. 3 is an elevational view of the same. Fig. 4 is a diagrammatic view showing the apparatus used in connection with an elevator. Fig. 5 is a detail view of a modified form of the circuit-interrupter, and Fig. 6 is a detail view of another form of commutator.

This invention relates to a new and useful improvement in regulating devices for electric circuits, the object being to control the circuit in such manner that resistance-coils are rendered unnecessary.

The principle of operation of my device is a rotating element provided with a series of terminals which are designed to pass the brush or other contact device, whereby the derived circuit is made and broken periodically and with rapidity, the position of the contact-brush with respect to the axes of rotation of the moving terminals being such that the length of interval of the break may be regulated so that the value of the derived current may be increased or diminished at will.

My invention consists in the construction, arrangement, and combination of the several parts, all as will hereinafter be described and afterward pointed out in the claims.

In the drawings, 1 indicates a motor, preferably in the form of an electric motor, which is energized from any suitable current, and upon the armature-shaft of which is arranged a series of disks 2. These disks have insulation material 3 arranged in one of the side faces thereof, whereby contact points or strips 4, preferably integral with the disks and flushed with the insulation-pieces, are exposed for contact with a brush 5. Brush 5 is mounted upon a rack-bar 6 and is guided in suitable ways on the standards or bearings of the armature-shaft, said rack-bars being connected at one end to springs 8, whereby they are induced to move in one direction.

9 indicates a shaft carrying pinions 10, in mesh with the several rack-bars, said shaft 9 having means for rotating the same, whereby the brushes of the respective circuit-interrupting disks are adjusted toward and from the axes of rotation of said disks.

In Fig. 4 I have illustrated my regulating apparatus in connection with an elevator, in which 11 indicates a cage or car suspended by ropes 12, wound on a drum 13, said drum being controlled by a motor 14, which motor is in a circuit derived from my improved regulating apparatus. 15 indicates a switch on the elevator-car, which switch controls the circuit in which motor 1 is located, whereby the operator on the car may start and stop said motor by manipulating said switch. Motor 1 is designed to be constantly rotated, so that the disks 2 are rotating during the entire time that the elevator-car is in service. 16 indicates a controlling-lever in the car, which lever is designed to coöperate with a tiller-rope 17 and through said rope actuate the rack-bars 6 inwardly and outwardly in starting and stopping the car or regulating the speed thereof. 18 indicates a binding-post to which is connected the inlead-wire of the power-circuit. 19 indicates one or more wires from post 18 to the armature-shaft, upon which the disks 2 are mounted. While I have shown a number of wires 19, it is obvious that but one of said wires is necessary to the armature-shaft and that this single wire through said shaft will electrically energize the metallic portions of disks 2. The bars 6 are insulated from the bearings of the armature-shaft of motor 1, but may be in an electrical connection with the brushes 5 and with the shaft 9, whereby one wire of the derived circuit may be employed instead of a number of wires, (indicated at 20 in the drawings,) which wires lead from the several brushes 5 to a common terminal 21. The derived circuit may be employed for energizing the motor 14, as shown in Fig. 4. 22 is the return-wire of the power-circuit. In operation the brushes 5 normally rest upon insulation-rings 3ª in the centers of the disks and in which position of the parts no current passes into said brushes from said disks. The disks rotating at a rapid speed will, when the brushes are moved outwardly through the points of the commutor-segments, permit only a small quantity of the current to flow into the brushes. It will be noted in this regard that the duration of time that any one terminal on the segment remains in contact with a brush is very slight and that as the brush is moved outwardly toward the periphery of the disk the length of time that the terminal on the segment remains in contact with the brush is gradually increased. Thus by reason of the fact that when the brush is near the center of the disk or its axis of rotation, where it will receive current but a short period of time in proportion to the time of rotation of its disk, and consequently the derived current will be of relatively small value as the brush moves outwardly, a greater proportion of current is permitted to flow into the brush, and consequently the value of the derived current is increased.

In Fig. 5 I have shown a modified form of disk in which it will be observed that as the brush rests on the central insulation-ring 3ᵇ no current will flow thereinto. As the brush moves outwardly it will contact with the points of the terminals 4ª, a continued outward movement of the brush toward the periphery bringing it in a position where no break occurs in the circuit to the brush, the brush near the periphery of the disk resting on a continuous metallic ring, whereby current is flowing thereinto at its full value.

In Fig. 6 I have shown a form of circuit-interrupter in which the brush is designed to rest upon the periphery thereof, the brush at one end bearing upon a continuous insulation-ring, and as the brush is moved longitudinally the current is made and broken, the amount of current flowing into the brush increasing until the brush rests on the continuous ring on the opposite end of the cylinder, when the current will flow into the brush without interruption.

Where a number of disks are employed, as shown in Figs. 2 and 3, for handling a heavy current, it is obvious that the makes and breaks in the current should be simultaneous, and for this reason the disks 2 are preferably all fixed to a common shaft and all of the brushes 5 bear a similar relation to all of the disks. By using a number of disks the liability of heavy sparking is reduced, and in order to avoid disintegration of the parts from sparking the disks and brushes may be submerged in oil, as is well understood.

While I have shown my improved apparatus as used in connection with an elevator-controlling mechanism, it is obvious that there are many uses to which the same may be put—such, for instance, as a controller for motors on street-cars, &c.

I am aware that many minor changes in the arrangement, construction, and combination of the several parts of my device can be made and substituted for those herein shown and described without in the least departing from the nature and principle of my invention.

Having thus described my invention, what I claim, and desire to secure by Letters Patent of the United States, is—

1. In an apparatus of the character described, the combination with a constantly-rotating circuit-interrupter whose face is composed of insulation material and contact-making segments alternately arranged and formed tapering, said contact-making surfaces being connected to a source of supply, a brush coöperating with said segments for conducting off the derived current, means for adjusting the position of said brush with respect to said segments, whereby, the period of contact of the brush with the segments may be regulated, and yielding means for returning said brush to normal position out of contact with the live segments; substantially as described.

2. In an apparatus of the character described, the combination with a constantly-rotating circuit-interrupter in the form of a disk having tapered contact faces or segments, tapered insulation material between said contact-faces, a brush contacting with the side face of said disk, means for adjusting said brush toward and from the axis of rotation of said disk, and a spring for returning said brush to its normal position adjacent the center of said disk; substantially as described.

3. In an apparatus of the character described, the combination with a plurality of circuit-interrupting disks mounted on a common shaft and electrically connected therewith, each of said disks consisting of contact-strips and insulation between said contact-strips, brushes coöperating with said contact-strips, and means for adjusting said brushes toward and from the axes of rotation of said disks; substantially as described.

4. In an apparatus of the character described, the combination with a plurality of circuit-interrupting disks whose strips are electrically connected, of means for rotating said disks, brushes coöperating with said disks, and means for simultaneously adjusting said brushes toward and from the axes of rotation of their respective disks; substantially as described.

5. In an apparatus of the character described, the combination with a motor and its shaft, of a plurality of circuit-interrupting disks mounted on said shaft and rotating therewith, each disk having an insulation-ring in its center, and contact-strips radiating from said insulation-ring, sliding bars carrying brushes designed to contact with said radiating strips, and means for moving all of said bars simultaneously so that said brushes are adjusted toward and from the axes of rotation of the disks; substantially as described.

6. In an apparatus of the character described, the combination with an interrupting-disk containing an insulation-ring and conducting-strips, of a brush adapted to rest wholly upon said insulation-ring, means for moving said brush off of said insulation-ring and into contact with said strips, and a spring for returning said brush onto said insulation-ring; substantially as described.

7. In an apparatus of the character described, the combination with an interrupting-disk provided with a continuous contact-ring and a continuous insulation-ring, oppositely-tapered contact and insulation strips between said continuous rings, a motor for rotating said disk, a brush, and means for moving said brush across the face of the disk from the insulation-ring to the continuous contact-ring and vice versa; substantially as described.

8. In an apparatus of the character described, the combination with a circuit-interrupter composed of a series of tapered contact-strips electrically connected together and with a source of supply, a continuous contact-ring adjacent to and connected with said strips, tapered insulation arranged between said contact-strips, a continuous insulation-ring adjacent said tapered strips of insulation, means constantly rotating said circuit-interrupter at a high speed, a brush designed to electrically contact with said tapered strips, and means for moving said brush over the face of said circuit-interrupter, whereby, the duration of contact between the brush and a conducting-strip may be controlled; substantially as described.

In testimony whereof I hereunto affix my signature, in the presence of two witnesses, this 24th day of October, 1901.

GEORGE P. McDONNELL.

Witnesses:
F. R. CORNWALL,
GEORGE BAKEWELL.